(12) United States Patent
Tanabe et al.

(10) Patent No.: US 11,663,539 B2
(45) Date of Patent: May 30, 2023

(54) VEHICLE RIDE-SHARING ASSIST SYSTEM

(71) Applicant: HONDA MOTOR CO., LTD., Tokyo (JP)

(72) Inventors: Hiroyuki Tanabe, Saitama (JP); Yuji Saito, Saitama (JP); Toru Kimura, Saitama (JP); Kuniaki Matsushima, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 37 days.

(21) Appl. No.: 16/981,942

(22) PCT Filed: Mar. 8, 2019

(86) PCT No.: PCT/JP2019/009357
§ 371 (c)(1),
(2) Date: Sep. 17, 2020

(87) PCT Pub. No.: WO2019/181566
PCT Pub. Date: Sep. 26, 2019

(65) Prior Publication Data
US 2021/0248540 A1  Aug. 12, 2021

(30) Foreign Application Priority Data
Mar. 20, 2018 (JP) .............. JP2018-052902

(51) Int. Cl.
*G06Q 10/06* (2023.01)
*G06Q 10/0631* (2023.01)
(Continued)

(52) U.S. Cl.
CPC ..... *G06Q 10/063116* (2013.01); *G06F 9/451* (2018.02); *G06F 16/9535* (2019.01);
(Continued)

(58) Field of Classification Search
CPC ........ G06Q 10/00; G06Q 10/02; G06Q 10/06; G06Q 10/10; G06Q 10/1097;
(Continued)

(56) References Cited

U.S. PATENT DOCUMENTS

2004/0128066 A1  7/2004 Kudo et al.
2008/0091342 A1* 4/2008 Assael ............... G01C 21/3438
701/533
(Continued)

FOREIGN PATENT DOCUMENTS

JP    2002140399 A    5/2002
JP    3527505 B2       5/2004
(Continued)

OTHER PUBLICATIONS

Lalos et al., A Framework for Dynamic Car and Taxi Pools with the Use of Positioning Systems, Nov. 1, 2009, 2009 Computation World: Future Computing, Service Computation, Cognitive , Adaptive, Content, Patterns, IEEE, pp. 385-391 (Year: 2009).*
(Continued)

*Primary Examiner* — Robert D Rines
(74) *Attorney, Agent, or Firm* — Armstrong Teasdale LLP

(57) ABSTRACT

A vehicle ride-sharing assist system includes a terminal including a user interface and a terminal processing unit; an action information managing server; and a ride-sharing managing server configured to create an operation schedule based on a desired ride-sharing condition, which includes at least one of a departure place, a departure time, an arrival place, and an arrival time of each user, transmitted from the terminal processing unit. The ride-sharing managing server is configured to set a recommended ride-sharing condition, which includes at least one of the departure place, the departure time, the arrival place, and the arrival time suitable for each user, based on the action information and transmit
(Continued)

the recommended ride-sharing condition to the terminal processing unit. The terminal processing unit is configured to cause the user interface to display the recommended ride-sharing condition on receiving the recommended ride-sharing condition from the ride-sharing managing server.

10 Claims, 12 Drawing Sheets

(51) Int. Cl.
*G06F 9/451* (2018.01)
*G06F 16/9535* (2019.01)
*G06Q 10/1091* (2023.01)
*G06Q 50/30* (2012.01)
*G06F 3/04842* (2022.01)

(52) U.S. Cl.
CPC ... *G06Q 10/06315* (2013.01); *G06Q 10/1091* (2013.01); *G06Q 50/30* (2013.01); *G06F 3/04842* (2013.01)

(58) Field of Classification Search
CPC ..... G06Q 10/036116; G06Q 10/06315; G06Q 30/02; G06Q 30/0201; G06Q 50/30; G06Q 50/10; G06Q 20/127; G06K 9/00838; G06F 16/27; G06F 16/9535; G06F 9/451; G06N 5/04; G06N 20/00; G01C 21/3407; G01C 21/3438; H04L 67/303; G08G 1/00
See application file for complete search history.

(56) References Cited

U.S. PATENT DOCUMENTS

| | | | | |
|---|---|---|---|---|
| 2009/0248587 | A1* | 10/2009 | Van Buskirk | G06Q 10/063112 707/999.005 |
| 2011/0145089 | A1* | 6/2011 | Khunger | G06Q 30/0611 705/26.4 |
| 2016/0138928 | A1* | 5/2016 | Guo | G06F 16/29 701/537 |
| 2016/0292596 | A1* | 10/2016 | Gaitan | G06Q 10/101 |
| 2016/0356615 | A1* | 12/2016 | Arata | G01C 21/3438 |
| 2017/0091891 | A1* | 3/2017 | Van Der Berg | G06Q 10/06315 |
| 2019/0370922 | A1* | 12/2019 | Asghari | G06Q 10/067 |

FOREIGN PATENT DOCUMENTS

| | | |
|---|---|---|
| JP | 2009128117 A | 6/2009 |
| JP | 2012221127 A | 11/2012 |
| JP | 2017167942 A | 9/2017 |

OTHER PUBLICATIONS

English Translation of International Search Report for JP Application PCT/JP2019/009357 dated Jun. 11, 2019, 4 pp.

* cited by examiner

Fig.2 user identification number: 12345    Taro Tokyo — T1

| date | clock-in time | clock-out time | content of event | magnitude |
|---|---|---|---|---|
| 7/1 | | | | 0 |
| 7/2 | | | | 0 |
| 7/3 | 8:30 | 18:10 | | 0 |
| 7/4 | | | vacation | |
| 7/5 | 8:20 | 18:05 | | 0 |
| 7/6 | 8:55 | 17:10 | | 0 |
| 7/7 | 8:40 | 18:20 | meeting 9:00 (first meeting room) | 5 |
| 7/8 | | | | |
| 7/9 | | | | |
| 7/10 | | | | |
| 7/11 | | | meeting 9:00 (first meeting room) | |
| 7/12 | | | business trip | |
| 7/13 | | | | |
| 7/14 | | | meeting 9:00 (third meeting room) | |
| 7/15 | | | | |
| 7/16 | | | | |
| ⋮ | | | | |

Fig.3

Monday, July 3, 2017

| application identification number | user identification number | departure place | arrival place | departure time | arrival time | vehicle identification number |
|---|---|---|---|---|---|---|
| 0001 | 10123 | 2-chome, Motomachi | west gate parking lot | 7:15 | 8:10 | - - |
| 0002 | 11243 | 6-chome, Shinmachi | main building | 8:00 | 8:40 | p134 |
| 0003 | 12345 | 1-chome, Honmachi | west gate parking lot | 7:45 | 8:30 | w123 |
| ... | ... | ... | ... | ... | ... | ... |

T2

| magnitude | keyword |
|---|---|
| 5 | first meeting room |
| 4 | second meeting room |
| 3 | third meeting room |
| 2 | fourth meeting room |
| ⋮ | |

VEHICLE RIDE-SHARING ASSIST SYSTEM

CROSS-REFERENCE TO RELATED APPLICATIONS

This application is a U.S. National Phase Application of PCT/JP2019/009357, filed Mar. 8, 2019, which claims the benefit of priority to JP Application No. 2018-052902, filed Mar. 20, 2018, the contents of which are hereby expressly incorporated by reference in their entirety.

TECHNICAL FIELD

The present invention relates to a vehicle ride-sharing assist system that provides ride-sharing services to users.

BACKGROUND ART

A vehicle ride-sharing assist system (ride-sharing system) known in the art assists ride-sharing of an automobile for a driver who has a plan to move in an automobile and a ride-sharing person who wants to ride another person's automobile and move to an arrival place (for example, Patent Document 1). The ride-sharing decreases the operation number of automobiles, thereby saving energy, reducing $CO_2$ emissions, and alleviating traffic congestion.

In the vehicle ride-sharing assist system according to Patent Document 1, the driver transmits driving schedule information including a departure place, an arrival place, and a departure time of the driver, and the ride-sharing person transmits desired ride-sharing condition including a current position, an arrival place, and an arrival time of the ride-sharing person. On receiving the driving schedule information and the desired ride-sharing condition, the vehicle ride-sharing assist system calculates the optimal combination of the driver and the ride-sharing person based on the driving schedule information and the desired ride-sharing condition, and creates an operation schedule of the ride-sharing that corresponds to the driving schedule information and the desired ride-sharing condition.

PRIOR ART DOCUMENT(S)

Patent Document(s)

Patent Document 1: JP2002-140399A

SUMMARY OF THE INVENTION

Task to be Accomplished by the Invention

However, if the ride-sharing person does not understand his/her schedule correctly or makes an erroneous input, the desired ride-sharing condition that does not correspond to a true demand of the ride-sharing person may be transmitted from the ride-sharing person to the vehicle ride-sharing assist system. In such a case, the vehicle ride-sharing assist system may create the operation schedule that does not correspond to the true demand of the ride-sharing person, and thus the cancellations of the ride-sharing increase. As a result, the combination of the driver and the ride-sharing person may not be optimal.

In view of such a background, an object of the present invention is to provide a vehicle ride-sharing assist system that can prevent transmission of a desired ride-sharing condition that does not correspond to a true demand of a user (ride-sharing person).

Means for Accomplishing the Task

To achieve such an object, one embodiment of the present invention provides a vehicle ride-sharing assist system (1) for assisting ride-sharing by plural users, including: a terminal (2) including a user interface (12) that includes an input unit (12B) and a display unit (12A), and a terminal processing unit (11) configured to control the user interface; an action information managing server (7) configured to store action information of the users; and a ride-sharing managing server (4) configured to communicate with the action information managing server and the terminal via a network (3) and create an operation schedule of the ride-sharing for a prescribed implementation period based on a desired ride-sharing condition transmitted from the terminal processing unit, the desired ride-sharing condition including at least one of a departure place, a departure time, an arrival place, and an arrival time of each of the users, wherein the ride-sharing managing server is configured to set a recommended ride-sharing condition for each of the users based on the action information and transmit the recommended ride-sharing condition to the terminal processing unit, the recommended ride-sharing condition including at least one of the departure place, the departure time, the arrival place, and the arrival time suitable for each of the users, and the terminal processing unit is configured to cause the user interface to display the recommended ride-sharing condition.

According to this arrangement, the recommended ride-sharing condition, which is set based on the action information that reflects a true demand of the user, is displayed on the user interface. Accordingly, it is possible to prevent transmission of the desired ride-sharing condition that does not correspond to the true demand of the user.

In the above arrangement, preferably, the terminal processing unit is configured to cause the user interface to simultaneously display an input field (40-44) to which the desired ride-sharing condition can be input and the recommended ride-sharing condition.

According to this arrangement, the user can input the desired ride-sharing condition to the input field while checking the recommended ride-sharing condition.

In the above arrangement, preferably, the terminal processing unit is configured to cause the recommended ride-sharing condition to be displayed in the input field.

According to this arrangement, the recommended ride-sharing condition is displayed in the input field. Accordingly, when the recommended ride-sharing condition corresponds to the true demand of the user, the user can omit to input the desired ride-sharing condition to the input field.

In the above arrangement, preferably, the terminal processing unit is configured to cause the user interface to display a decision button (35) together with the recommended ride-sharing condition, the decision button being configured to receive a decision whether to transmit the recommended ride-sharing condition as the desired ride-sharing condition to the ride-sharing managing server.

According to this arrangement, when the desired ride-sharing condition corresponds to the recommended ride-sharing condition, the user can easily transmit the desired ride-sharing condition to the ride-sharing managing server according to an input to the decision button without an input of the desired ride-sharing condition.

In the above arrangement, preferably, when an input corresponding to a decision not to transmit the recommended ride-sharing condition as the desired ride-sharing condition to the ride-sharing managing server is made to the decision button, the terminal processing unit is configured to cause the user interface to display an input field (40-44) to which the desired ride-sharing condition can be input, the desired ride-sharing condition including at least one of the departure place, the departure time, the arrival place, and the arrival time desired by each of the users.

According to this arrangement, the user can input the desired ride-sharing condition to the input field while checking the recommended ride-sharing condition.

In the above arrangement, preferably, the terminal processing unit is configured to cause the recommended ride-sharing condition to be displayed in the input field.

According to this arrangement, the recommended ride-sharing condition is displayed in the input field. Accordingly, when the recommended ride-sharing condition corresponds to the true demand of the user, the user can omit to input the desired ride-sharing condition to the input field.

In the above arrangement, preferably, the departure place or the arrival place is set to a prescribed place common to all of the users.

According to this arrangement, by setting the departure place or the arrival place to a workplace, the vehicle ride-sharing assist system can be used to assist the ride-sharing for commuting. In addition, by setting the departure place or the arrival place to a school, the vehicle ride-sharing assist system can be used to assist the ride-sharing for going to school.

In the above arrangement, preferably, the action information includes movement information corresponding to presence or absence of a movement to a place stored in advance, and when the action information for the implementation period of the ride-sharing includes the movement information corresponding to the absence of the movement, the ride-sharing managing server does not set the recommended ride-sharing condition.

According to this arrangement, the recommended ride-sharing condition is not set when the action information for the implementation period includes the movement information corresponding to the absence of the movement to the place stored in advance, such as a workplace. Accordingly, when the use is unlikely to use the ride-sharing, the recommended ride-sharing condition is not displayed on the user interface. On the other hand, when the user is likely to use the ride-sharing, the recommended ride-sharing condition is displayed on the user interface. Accordingly, when the recommended ride-sharing condition is not displayed, the user can recognize that his/her schedule is not suitable for using the ride-sharing, so that it is possible to prevent a ride-sharing application that does not correspond to the true demand of the user.

In the above arrangement, preferably, the vehicle ride-sharing assist system further includes an attendance recording unit (18) configured to acquire a clock-in time of each of the users, wherein the action information includes at least one past clock-in time, and the ride-sharing managing server is configured to estimate the clock-in time of each of the users for the implementation period based on the past clock-in time and set the arrival time of the recommended ride-sharing condition based on the estimated clock-in time.

According to this arrangement, it is possible to make the recommended ride-sharing condition more suitable for the user.

In the above arrangement, preferably, the ride-sharing managing server is configured to output magnitude corresponding to each piece of the action information stored in the action information managing server, calculate a shift time that increases as the magnitude increases, and set the arrival time of the recommended ride-sharing condition based on a time earlier than the estimated clock-in time by the shift time.

According to this arrangement, the arrival time can be advanced according to the magnitude of the action information for the implementation period. Accordingly, it is possible to make the recommended ride-sharing condition more suitable for the user.

In the above arrangement, preferably, the vehicle ride-sharing assist system further includes an attendance recording unit (18) configured to acquire a clock-out time of each of the users, wherein the action information includes at least one past clock-out time, and the ride-sharing managing server is configured to estimate the clock-out time of each of the users for the implementation period based on the past clock-out time and set the departure time of the recommended ride-sharing condition based on the estimated clock-out time.

According to this arrangement, it is possible to make the recommended ride-sharing condition more suitable for the user.

EFFECT OF THE INVENTION

According to the above arrangements, it is possible to provide a vehicle ride-sharing assist system that can prevent transmission of a desired ride-sharing condition that does not correspond to a true demand of a user.

BRIEF DESCRIPTION OF THE DRAWING(S)

FIG. 2 shows an example of the data input to an action information table;

FIG. 3 shows an example of the data input to an application information table;

MODE(S) FOR CARRYING OUT THE INVENTION

In the following, embodiments of the vehicle ride-sharing assist system will be described with reference to the drawings. The vehicle ride-sharing assist system 1 according to the present embodiments provides a ride-sharing service to assist ride-sharing when plural users (members) who belong to a specific group (company or government office) move to a specific place (workplace) during morning commuting hours (implementation period). The ride-sharing service is a service to receive a desired ride-sharing condition desired by each user (such as a departure place, an arrival place, a departure time, and an arrival time) from each user, determine the optimal combination of the users who use the ride-sharing, the optimal vehicle, and the optimal travel route (for example, the route that can minimize the traffic congestion) based on the received desired ride-sharing condition, and notify each user of the optimal combination of the users, the optimal vehicle, and the optimal travel route.

The group that uses the vehicle ride-sharing assist system 1 owns plural shared vehicles in order to cause the users to use the shared vehicles. In the vehicle ride-sharing assist system 1, the plural shared vehicles and the vehicles which the users have agreed to use for the ride-sharing (hereinafter referred to as "provided vehicles") are used for the ride-sharing. User identification numbers are set for all the users, and vehicle identification numbers are set for all the shared vehicles and all the provided vehicles.

First Embodiment (Configuration of the Vehicle Ride-Sharing Assist System)

Figure 1:
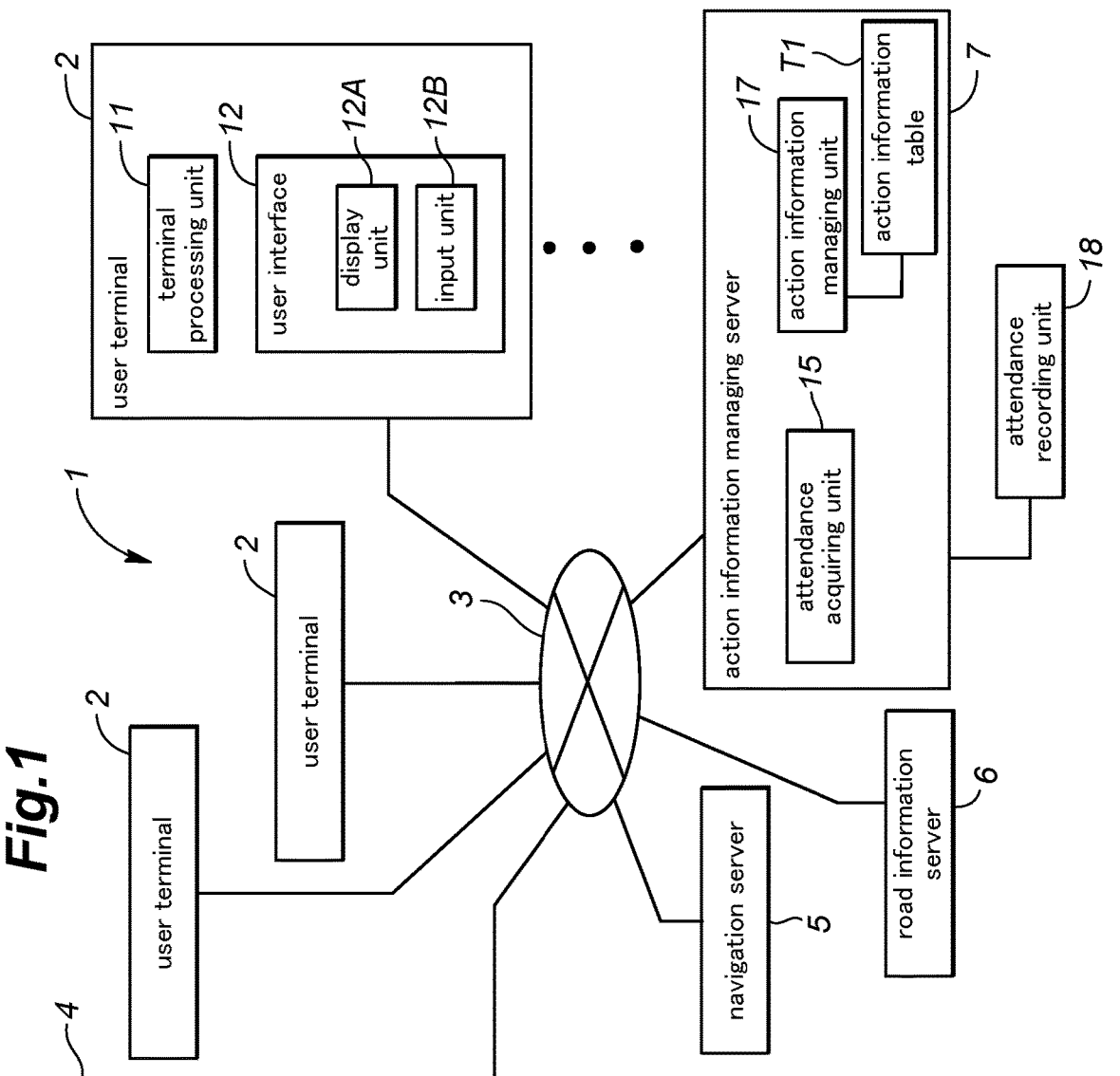
FIG. 1 is a block diagram of a vehicle ride-sharing assist system according to a first embodiment.

As shown in FIG. 1, the vehicle ride-sharing assist system 1 includes plural user terminals 2, an action information managing server 7, and a ride-sharing managing server 4. The action information managing server 7 is configured to manage action information of each user. The ride-sharing managing server 4 is configured to set a recommended ride-sharing condition based on the action information of each user, cause each user terminal 2 to display the recommended ride-sharing condition, create ride-sharing groups by processing a desired ride-sharing condition transmitted from each user terminal 2, and thus determine an operation schedule of the vehicle of each ride-sharing group. User terminals 2, the action information managing server 7, and the ride-sharing managing server 4 are connected via a network 3. Each user terminal 2 is carried by each user, and both the action information managing server 7 and the ride-sharing managing server 4 are provided inside the building of the company that manages the vehicle ride-sharing assist system 1. The network 3 is, for example, the Internet.

The action information managing server 7 includes an action information managing unit 17 configured to hold an action information table T1 (FIG. 2) in which the action information of each user is recorded. The action information includes a date, a clock-in time and a clock-out time of each user on that date, the content of an event, and magnitude corresponding to the content of the event. The content of the event includes movement information corresponding to the presence or absence of a movement to the workplace. In the present embodiment, the content of the event is a blank (normal work), or includes schedule information of a vacation, a business trip, or a meeting. The schedule information may include information about a start time, an end time, and a place of the meeting. The user terminal 2 may write and correct the content of the event via the network 3. The magnitude is determined per content of the event, and is a numerical value that is set to increase as the importance of the corresponding event increases. In the present embodiment, the magnitude is determined based on the place where the meeting is held, and is set to a numerical value of 0-5.

The action information managing server 7 includes an attendance acquiring unit 15, and is connected to an attendance recording unit 18 (for example, a time card recorder) configured to record a clock-in time and a clock-out time of each user. The attendance acquiring unit 15 is configured to receive the clock-in time and the clock-out time of each user recorded by the attendance recording unit 18 and thus record the clock-in time and the clock-out time of each user in the action information table T1.

The ride-sharing managing server 4 includes an application processing unit 22, an application information managing unit 23, an operation schedule creating unit 24, a ride-sharing information managing unit 25, a user attribute managing unit 26, a vehicle information managing unit 27, a road information acquiring unit 28, and a user notification unit 29. The application processing unit 22 is configured to execute a reception process of a ride-sharing application. The application information managing unit 23 is configured to store application information. The operation schedule creating unit 24 is configured to create plural ride-sharing groups by grouping the users who have made the ride-sharing application and create operation schedule information of the vehicle for each ride-sharing group by using an external navigation server 5 configured to hold map information. The ride-sharing information managing unit 25 is configured to store the created ride-sharing groups and the created operation schedule information. The user attribute managing unit 26 is configured to hold user attribute information. The vehicle information managing unit 27 is configured to hold registered vehicle information. The road information acquiring unit 28 is configured to acquire traffic congestion information by using an external road information server 6. The user notification unit 29 is configured to execute a process to notify the user of the operation schedule information.

The user attribute managing unit 26 is configured to store information related to the user as the user attribute information. The user attribute information includes a user identification number, a user's name, a user's address, a user's workplace, and information about the user terminal 2 owned by the user. The information about the user terminal 2 is used by the action information managing server 7 and the ride-sharing managing server 4 to communicate with the user terminal 2. In the present embodiment, the workplace of each user is set to one site common to all users (one site where a company, a government office, or the like is located).

The vehicle information managing unit 27 is configured to store information about the shared vehicles and the provided vehicles, which are registered as vehicles used for the ride-sharing, as the vehicle information. The vehicle information includes information about each registered vehicle, such as a vehicle identification number, an owner, a vehicle type, and a passenger capacity. Regarding the provided vehicle, the owner is a person who owns the vehicle. Regarding the shared vehicle, the owner is a person who owns a key of the vehicle. As described below, the owner is updated every time the ride-sharing service is provided.

The application information managing unit 23 is configured to hold an application information table T2 (FIG. 3). In the application information table T2, an application identification number and application information corresponding to the application identification number are recorded. The application information includes the desired ride-sharing condition including the user identification number, the departure place, the arrival place, the departure time, and the arrival time of the user who has made the application. Further, the application information includes the vehicle identification number of the provided vehicle or the shared vehicle whose key is owned by the user who has made the application.

The application processing unit 22 includes a magnitude output unit 31, an availability determination unit 32, a recommended condition setting unit 33, a reception start signal transmitting unit 34, and an alert unit 30. The magnitude output unit 31 is configured to output the magnitude corresponding to the content of the event in the action information table T1. The availability determination unit 32 is configured to determine whether the ride-sharing is available based on the content of the event. The recommended condition setting unit 33 is configured to set the recommended ride-sharing condition including the departure place, the arrival place, the departure time, and the arrival time corresponding to the action information of each user. Further, the recommended condition setting unit 33 is configured to set a recommended vehicle identification number, which is a vehicle identification number of the provided vehicle or the shared vehicle suitable for the ride-sharing. The reception start signal transmitting unit 34 is configured to transmit a reception start signal to the user terminal 2. The reception start signal includes the set recommended ride-sharing condition, the set recommended vehicle identification number, and a signal indicating that the reception of the ride-sharing application has started. The alert unit 30 is configured to compare the received application information with the action information table T1, and transmit an alert signal to the user terminal 2 in a case where the received application information does not correspond to the action information table T1.

Figure 4:
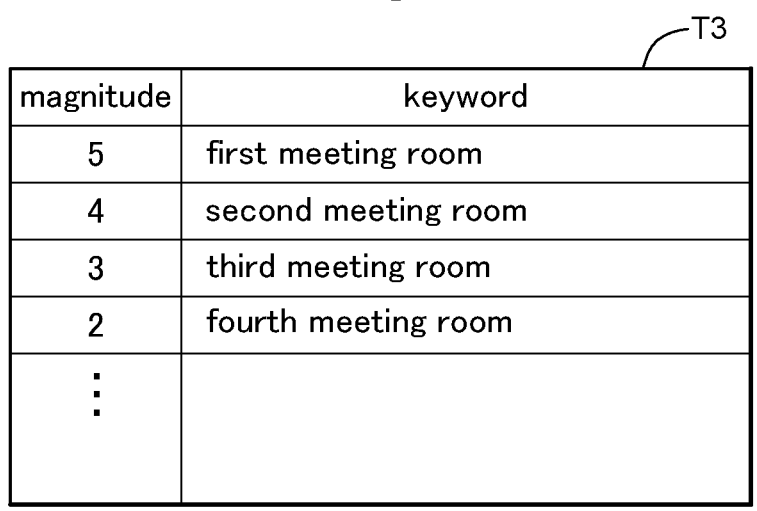
FIG. 4 shows an example of the data input to a magnitude calculation table.

The magnitude output unit 31 is configured to hold a magnitude calculation table T3 (FIG. 4), in which a relationship between keywords that can be included in the content of the event of the action information table T1 and the magnitude of the event corresponding to each keyword is recorded. For example, in the magnitude calculation table T3, "first meeting room" as a place where the meeting is held and the magnitude "5" corresponding to the meeting are recorded so as to be related to each other. The magnitude output unit 31 is configured to determine the magnitude corresponding to the content of each event by referring to the magnitude calculation table T3 and write (output) the magnitude to the action information table T1.

The availability determination unit 32 is configured to determine whether the ride-sharing is available to each user by referring to the content of the event described on the date (in the present embodiment, the date of the next day) corresponding to the implementation period of the action information table T1 of each user. For example, in a case where the content of the event includes the word "vacation", the availability determination unit 32 determines that the ride-sharing is not available. In a case where the date corresponding to the implementation period is a workday and the content of the event is a blank, the availability determination unit 32 determines that the ride-sharing is available.

The recommended condition setting unit 33 is configured to set the recommended ride-sharing condition including the departure place, the arrival place, the departure time, and the arrival time corresponding to the action information of each user based on information included in the action information table T1. Further, the recommended condition setting unit 33 is configured to refer to the vehicle information held by the vehicle information managing unit 27, and thus set the recommended vehicle identification number, which is the vehicle identification number of the provided vehicle or the shared vehicle suitable for the ride-sharing.

More specifically, the recommended condition setting unit 33 is configured to acquire the date corresponding to the implementation period and acquire the content of the event on that date by referring to the action information table T1. In a case where the content of the event includes "vacation" or "business trip", the recommended condition setting unit 33 does not output the recommended ride-sharing condition. In a case where the content of the event is a blank, the recommended condition setting unit 33 calculates an average clock-in time by averaging the clock-in times from one date a signal is received to another date one month before the one date. The recommended condition setting unit 33 is configured to output a time (hereinafter referred to as "first time") earlier than the average clock-in time by a prescribed movement time as the arrival time of the recommended ride-sharing condition. The movement time may be determined based on the time to move from the arrival place of the undermentioned recommended ride-sharing condition to an actual workplace.

In a case where the content of the event includes "meeting", the recommended condition setting unit 33 estimates the start time of the meeting, calculates a time earlier than the start time by a shift time, and further calculates another time (hereinafter referred to as "second time") earlier than the above calculated time by the movement time. The shift time is, for example, the product of the magnitude and a prescribed time (10 minutes), and increases as the magnitude of the event increases. Next, the recommended condition setting unit 33 calculates the above first time, compares the first time and the second time, and outputs the earlier of the first time and the second time as the arrival time of the recommended ride-sharing condition. According to this configuration, the user can advance the arrival time of the recommended ride-sharing condition according to the magnitude of the meeting. Accordingly, it is possible to make the arrival time of the recommended ride-sharing condition more suitable for the user.

Further, the recommended condition setting unit 33 acquires the user's address by referring to the user attribute information, and outputs the user's address as the departure place of the recommended ride-sharing condition. Next, the recommended condition setting unit 33 acquires the workplace of the user attribute information, selects an appropriate place as the arrival place of the vehicle, and outputs the selected appropriate place as the arrival place of the recommended ride-sharing condition.

Next, the recommended condition setting unit 33 calculates the required time for arriving the arrival place based on the departure place and the arrival place, calculates the time earlier than the arrival time of the recommended ride-sharing condition by the required time, and outputs the calculated time as the departure time of the recommended ride-sharing condition.

Further, the recommended condition setting unit 33 is configured to search the vehicle information for the user identification number of each user, and thus determines whether each user owns the key of the shared vehicle or the key of the provided vehicle. In a case where the user owns both the key of the shared vehicle and the key of the provided vehicle, the recommended condition setting unit 33 outputs the vehicle identification number of the shared vehicle as the recommended vehicle identification number. In a case where the user owns only the key of the shared vehicle and does not own the key of the provided vehicle, the recommended condition setting unit 33 outputs the vehicle identification number of the shared vehicle as the recommended vehicle identification number. In a case where the user does not own the key of the shared vehicle but owns only the key of the provided vehicle, the recommended condition setting unit 33 outputs the vehicle identification number of the provided vehicle as the recommended vehicle identification number. In a case where the user does not own the key of either vehicle, the recommended condition setting unit 33 outputs a blank as the recommended vehicle identification number.

On receiving the application information, the alert unit 30 acquires the date corresponding to the implementation period to be a target of the ride-sharing application, compares the application information of each user with the content of the event (specifically, the content of the event described on the date corresponding to the implementation period of the action information table T1 of each user), and determines whether the application information of each user and the content of the event correspond to each other. For example, in a case where the departure time of the application information is 8:30 and the content of the event described on the date corresponding to the implementation period includes "vacation", the alert unit 30 may determine that the application information and the content of the event do not correspond to each other. In a case where the application information and the content of the event do not correspond to each other, the alert unit 30 transmits an alert signal to the user terminal 2.

The operation schedule creating unit 24 is configured to execute a prescribed driver candidate setting process based on the user attribute information, and thus set each user recorded in the application information table T2 to either a driver candidate or a passenger candidate (a person who does not drive the vehicle). Further, the operation schedule creating unit 24 is configured to group the users who have made the ride-sharing application by using the navigation server 5 based on the traffic congestion information acquired by the road information acquiring unit 28, the information written to the application information table T2, the user attribute information, and the vehicle information. Also, the operation schedule creating unit 24 is configured to create plural ride-sharing groups that can minimize the traffic congestion and the operation schedule information of the vehicle of each ride-sharing group. The operation schedule information includes a group identification number of the ride-sharing group, the user identification numbers of all users included in the corresponding ride-sharing group, the user identification number of the user set to the driver, the vehicle identification number of the vehicle to be used, the travel route of the vehicle, and the departure place, the arrival place, the departure time, and the arrival time of all users.

The ride-sharing information managing unit 25 is configured to store the operation schedule information created by the operation schedule creating unit 24. Further, the ride-sharing information managing unit 25 is configured to write the driver to the vehicle information such that the driver is set as the owner.

The user notification unit 29 is configured to create user operation schedule information corresponding to each user based on the operation schedule information stored in the ride-sharing information managing unit 25 and transmit the corresponding user operation schedule information to the user terminal 2 of each user. The user operation schedule information includes the group identification number of the ride-sharing group to which the user belongs, the travel route of the vehicle of the ride-sharing group, the user identification numbers of all users included in the ride-sharing group, the user identification number of the user set to the driver, the vehicle identification number of the vehicle to be used for the ride-sharing, and the departure place, the arrival place, the departure time, and the arrival time of each user.

The user terminal 2 is, for example, a smartphone, a tablet PC, a mobile phone, a PDA, or the like. The user terminal 2 includes a terminal processing unit 11 configured to execute an application, a user interface 12 configured to be controlled by the terminal processing unit 11, and a memory. The user interface 12 includes a display unit 12A configured to display an input screen and a message based on a signal from the terminal processing unit 11, and an input unit 12B configured to receive an input from the user. In a case where the user terminal 2 is a smartphone, a tablet PC, or a PDA, the user interface 12 is a touch panel, the display unit 12A is a liquid crystal panel, and the input unit 12B is a touch sensor. In a case where the user terminal 2 is a mobile phone, the display unit 12A of the user interface 12 is a liquid crystal panel, and the input unit 12B is an operation button.

When the terminal processing unit 11 receives the reception start signal, the terminal processing unit 11 executes the undermentioned terminal side application reception process, thereby displaying the recommended ride-sharing condition on the display unit 12A and transmitting the application information to the ride-sharing managing server 4 based on the input to the input unit 12B. When the terminal processing unit 11 receives the user operation schedule information, the terminal processing unit 11 causes the display unit 12A to display the user operation schedule information. When the terminal processing unit 11 receives the alert signal, the terminal processing unit 11 causes the display unit 12A to display a prescribed alarm.

(Ride-Sharing Assist Process)

In the following, steps of a ride-sharing assist process in the vehicle ride-sharing assist system 1 will be described. The ride-sharing managing server 4 sets the implementation periods of the ride-sharing, and executes the ride-sharing assist process to assist the ride-sharing of the users in each implementation period. The implementation period is, for example, the commuting hours (from 6 a.m. to 10 a.m.) on weekday mornings. The vehicle ride-sharing assist system 1 executes the ride-sharing assist process once for each implementation period. For each implementation period, a reception start time for starting the reception of the ride-sharing application from the user and a reception end time for ending the reception thereof are determined. In a case where the implementation period is from 6 a.m. to 10 a.m. (commuting hours in the morning) of a certain day, the reception start time is set to 11:00 of the day before the certain day, and the reception end time is set to 20:00 of the day before the certain day, for example.

Figure 5:
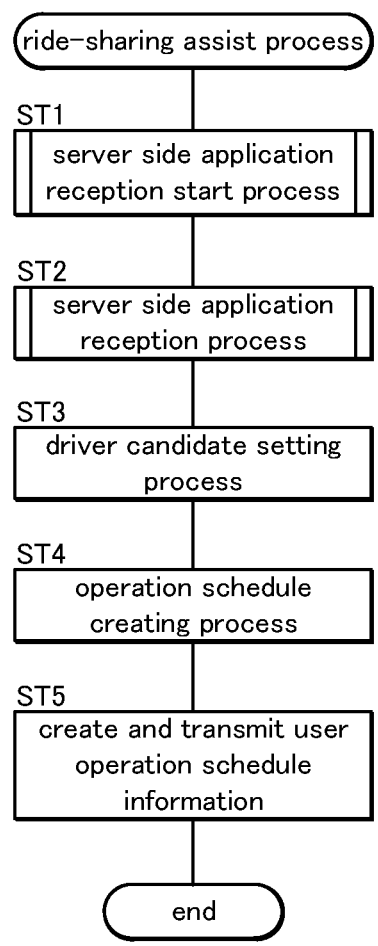
FIG. 5 is a flowchart showing steps of a ride-sharing assist process.

FIG. 5 is a flowchart showing the steps of the ride-sharing assist process. First, in step ST1, the application processing unit 22 of the ride-sharing managing server 4 executes a server side application reception start process when the reception start time arrives. In the server side application reception start process, the application processing unit 22 selects the user to whom the ride-sharing is available and transmits the reception start signal to the user terminal 2 owned by the user.

On receiving the reception start signal, the user terminal 2 executes a terminal side application reception process, which is not shown in FIG. 5. In the terminal side application reception process, the user terminal 2 receives the application information including the desired ride-sharing condition from the user, and transmits the application information to the ride-sharing managing server 4 when the ride-sharing application is made.

Next, on receiving the application information, the application processing unit 22 of the ride-sharing managing server 4 executes a server side application reception process (step ST2). In the server side application reception process, the application processing unit 22 determines whether the time when the application information is received is on or before the reception end time. In a case where the above time is on or before the reception end time, the application processing unit 22 writes the application information to the application information table T2 held by the application information managing unit 23.

Next, the operation schedule creating unit 24 executes a driver candidate setting process (step ST3) based on the application information table T2. By this process, the driver candidate is set from the users who have made the ride-sharing application. In this process, the user who is not set to the driver candidate is set to the passenger candidate (the person who does not drive the vehicle). The operation schedule creating unit 24 causes the application information managing unit 23 to store the user attribute information indicating whether each user is the driver candidate or the passenger candidate.

Next, the operation schedule creating unit 24 executes an operation schedule creating process (step ST4). By the operation schedule creating process, plural ride-sharing groups and the operation schedule information about the vehicle of each ride-sharing group are created. The operation schedule creating unit 24 causes the ride-sharing information managing unit 25 to store the created operation schedule information.

Next, the user notification unit 29 creates the user operation schedule information based on the operation schedule information stored in the ride-sharing information managing unit 25, and transmits the corresponding user operation schedule information to each user terminal 2 (step ST5). The user operation schedule information is displayed on the display unit 12A of the user terminal 2. Accordingly, each user can check own operation schedule information.

(Server Side Application Reception Start Process)

Figure 6:
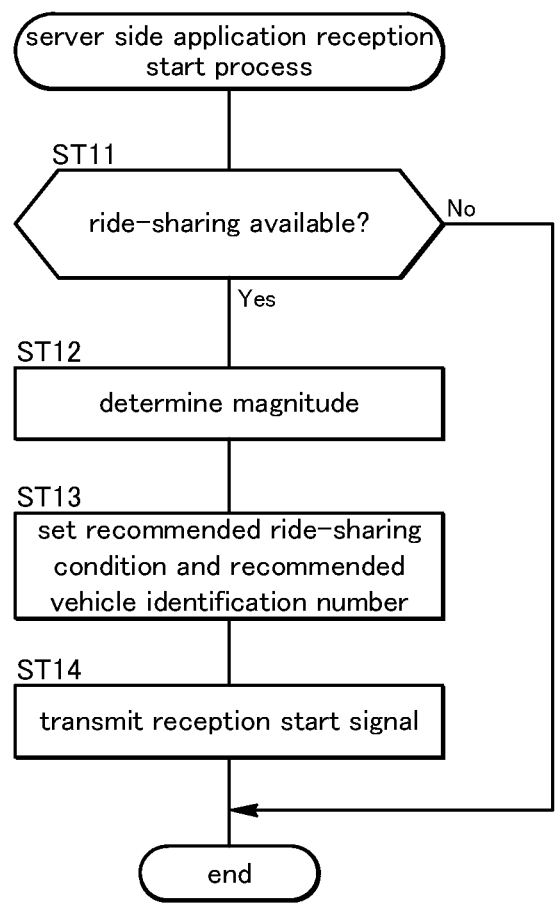
FIG. 6 is a flowchart showing steps of a server side application reception start process.

FIG. 6 is a flowchart showing a server side application reception start process. The server side application reception start process is executed by the application processing unit 22 of the ride-sharing managing server 4. The server side application reception start process is executed for each registered user.

In the first step ST11 of the server side application reception start process, the availability determination unit 32 determines whether the ride-sharing is available on the next day. When the availability determination unit 32 determines that the ride-sharing is available (Yes), the application processing unit 22 executes step ST12. When the availability determination unit 32 determines that the ride-sharing is not available (No), the application processing unit 22 ends the server side application reception start process.

In step ST12, the magnitude output unit 31 acquires the content of the event on the next day by referring to the action information table T1, and thus determines the magnitude corresponding to the content of the event by referring to the magnitude calculation table T3. After determining the magnitude, the magnitude output unit 31 writes the magnitude to a magnitude field on the next day in the action information table T1. Next, in step ST13, the recommended condition setting unit 33 sets the recommended ride-sharing condition and the recommended vehicle identification number.

Next, in step ST14, the reception start signal transmitting unit 34 transmits the reception start signal including the recommended ride-sharing condition and the recommended vehicle identification number to the corresponding user terminal 2, and the server side application reception start process ends.

(Terminal Side Application Reception Process)

Figure 7:
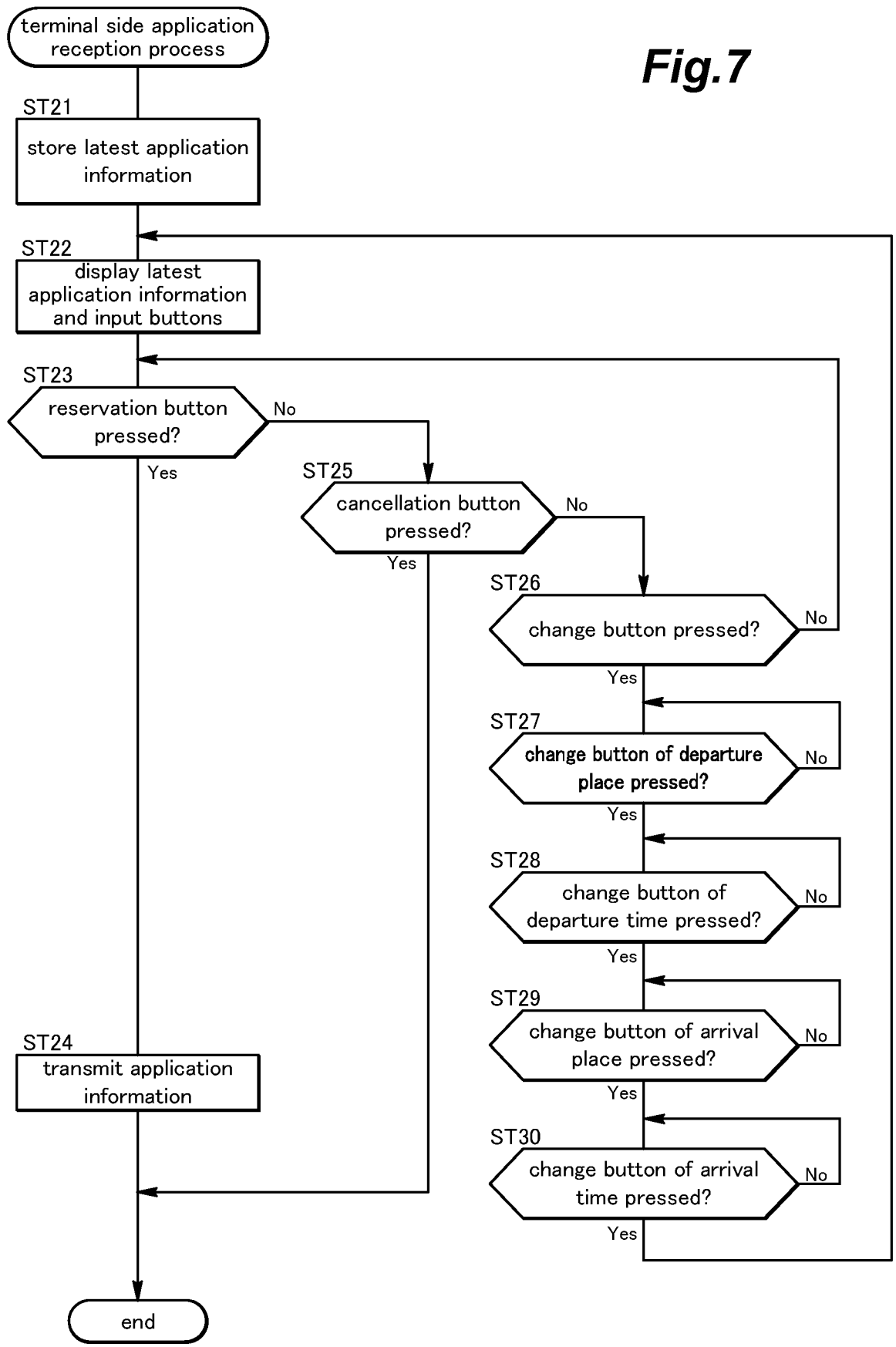
FIG. 7 is a flowchart showing steps of a terminal side application reception process.

FIG. 7 is a flowchart showing a terminal side application reception process. The terminal side application reception process is executed by the terminal processing unit 11 after the user terminal 2 receives the reception start signal. In the first step ST21 of the terminal side application reception process, the terminal processing unit 11 causes the memory to store the received recommended ride-sharing condition and the received recommended vehicle identification number as the latest application information. After that, the terminal processing unit 11 executes step ST22.

Figure 8C:
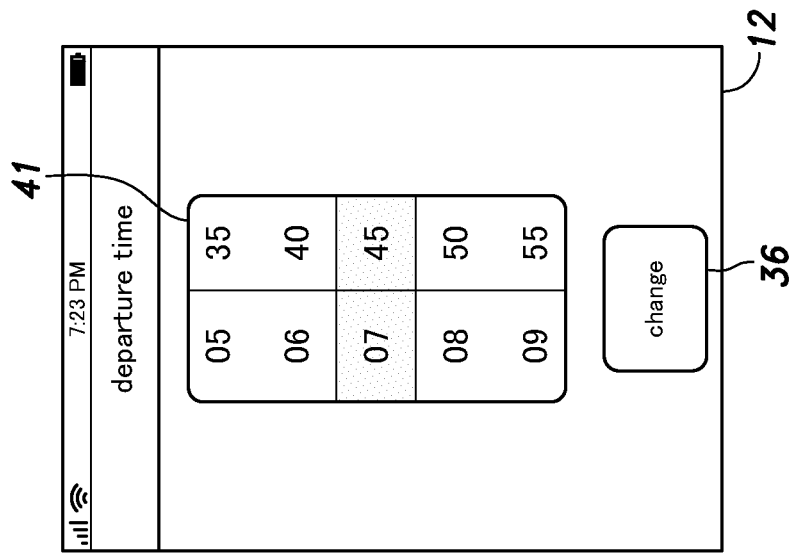
FIG. 8C shows the screen transition of the user terminal in the terminal side application reception process at step ST28.
Figure 8B:
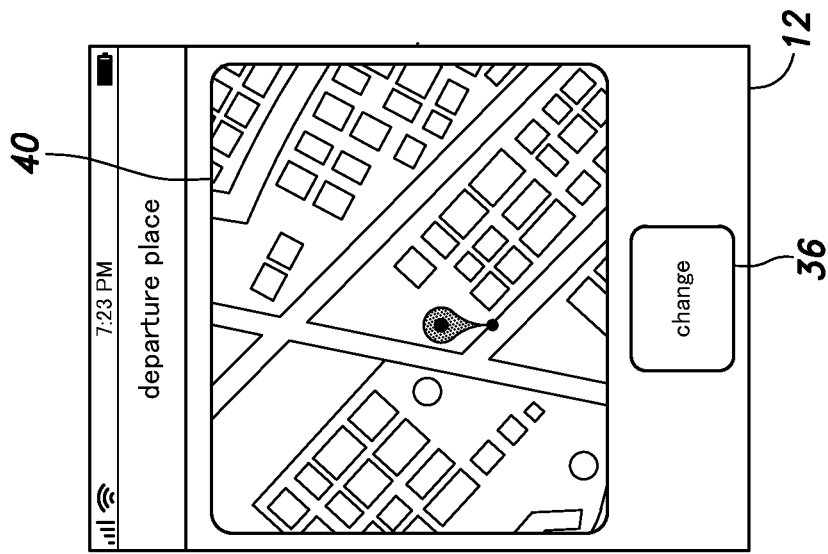
FIG. 8B shows the screen transition of the user terminal in the terminal side application reception process at step ST27.
Figure 8A:
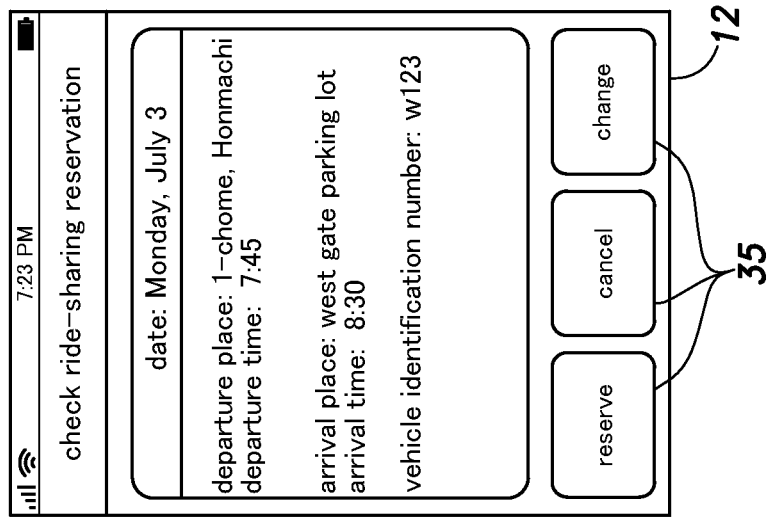
FIG. 8A shows the screen transition of a user terminal in the terminal side application reception process at step ST22.

In step ST22, the terminal processing unit 11 causes the user interface 12 to simultaneously display the latest application information stored in the memory and three input buttons 35 (decision buttons) (FIG. 8A). The three input buttons 35 include a reservation button displayed as "reserve", a cancellation button displayed as "cancel", and a change button displayed as "change". The input to each input button 35 is made by pressing of each input button 35 by the user. When the reservation button is pressed (step ST23), the terminal processing unit 11 executes step ST24. When the cancellation button is pressed (step ST25), the terminal processing unit 11 ends the terminal side application reception process. When the change button is pressed (step ST26), the terminal processing unit 11 executes step ST27. The terminal processing unit 11 waits until either of the input buttons 35 is pressed while sequentially executing steps ST23, ST25, and ST26.

In step ST24, the terminal processing unit 11 transmits the latest application information stored in the memory to the ride-sharing managing server 4 as the application information. When the transmission of the application information is completed, the terminal processing unit 11 ends the terminal side application reception process.

In step ST27, the terminal processing unit 11 causes the user interface 12 to display an input field 40 and a change button 36 such that a mark indicating the departure place of the latest application information is displayed in a map shown in the input field 40 (FIG. 8B). When the input field 40 is pressed, the terminal processing unit 11 moves the mark to the pressed position. When the change button 36 is pressed, the terminal processing unit 11 updates the departure place of the latest application information to the position of the mark in the input field 40, and executes step ST28.

In step ST28, the terminal processing unit 11 causes the user interface 12 to display the change button 36 and an input field 41 for inputting the desired departure time of the user such that the departure time of the latest application information has been input to the input field 41 in advance (FIG. 8C). At this time, the departure time of the latest application information is displayed in the input field 41. In the present embodiment, a rotary drum style (picker view style) is applied to the input field 41. When the change button 36 is pressed, the terminal processing unit 11 updates the departure time of the latest application information to the departure time input to the input field 41, and executes step ST29.

Figure 9B:
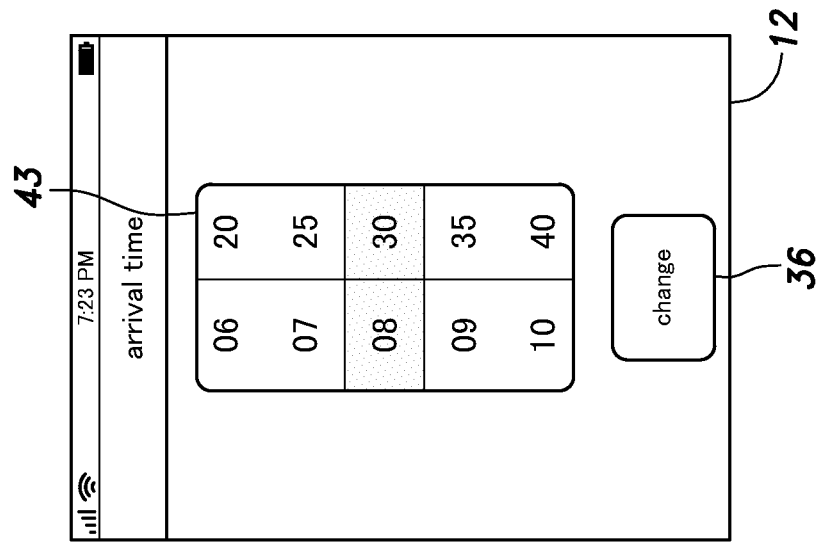
FIG. 9B shows the screen transition of the user terminal in the terminal side application reception process at step ST30.
Figure 9A:
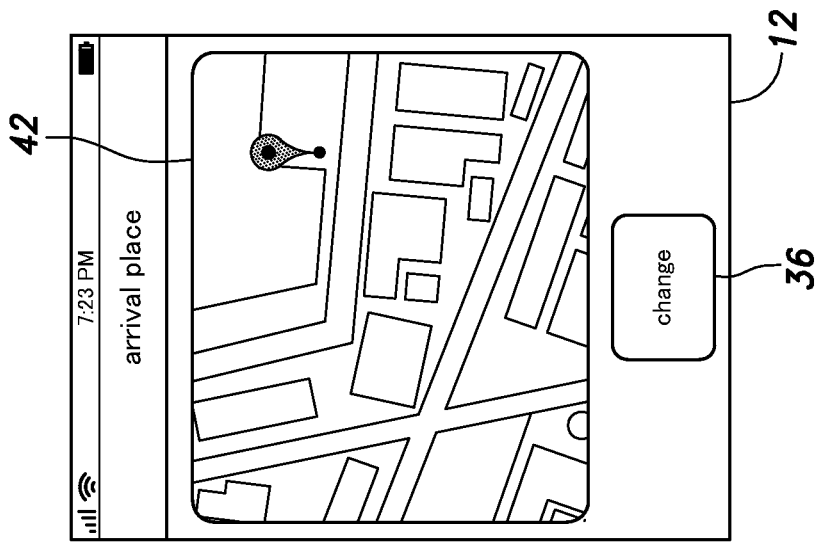
FIG. 9A shows the screen transition of the user terminal in the terminal side application reception process at step ST29.

In step ST29, the terminal processing unit 11 causes the user interface 12 to display an input field 42 and the change button 36 such that a mark indicating the arrival place of the latest application information is displayed in a map shown in the input field 42 (FIG. 9A). When the input field 42 is pressed, the terminal processing unit 11 moves the mark to the pressed position. When the change button 36 is pressed, the terminal processing unit 11 updates the arrival place of the latest application information to the position of the mark in the input field 42, and executes step ST30.

In step S30, the terminal processing unit 11 causes the user interface 12 to display the change button 36 and an input field 43 of the arrival time such that the arrival time of the latest application information has been input to the input field 43 in advance (FIG. 9B). When the change button 36 is pressed, the terminal processing unit 11 updates the arrival time of the latest application information to the arrival time input to the input field 43, and returns to step ST22.

(Server Side Application Reception Process)

Figure 10:
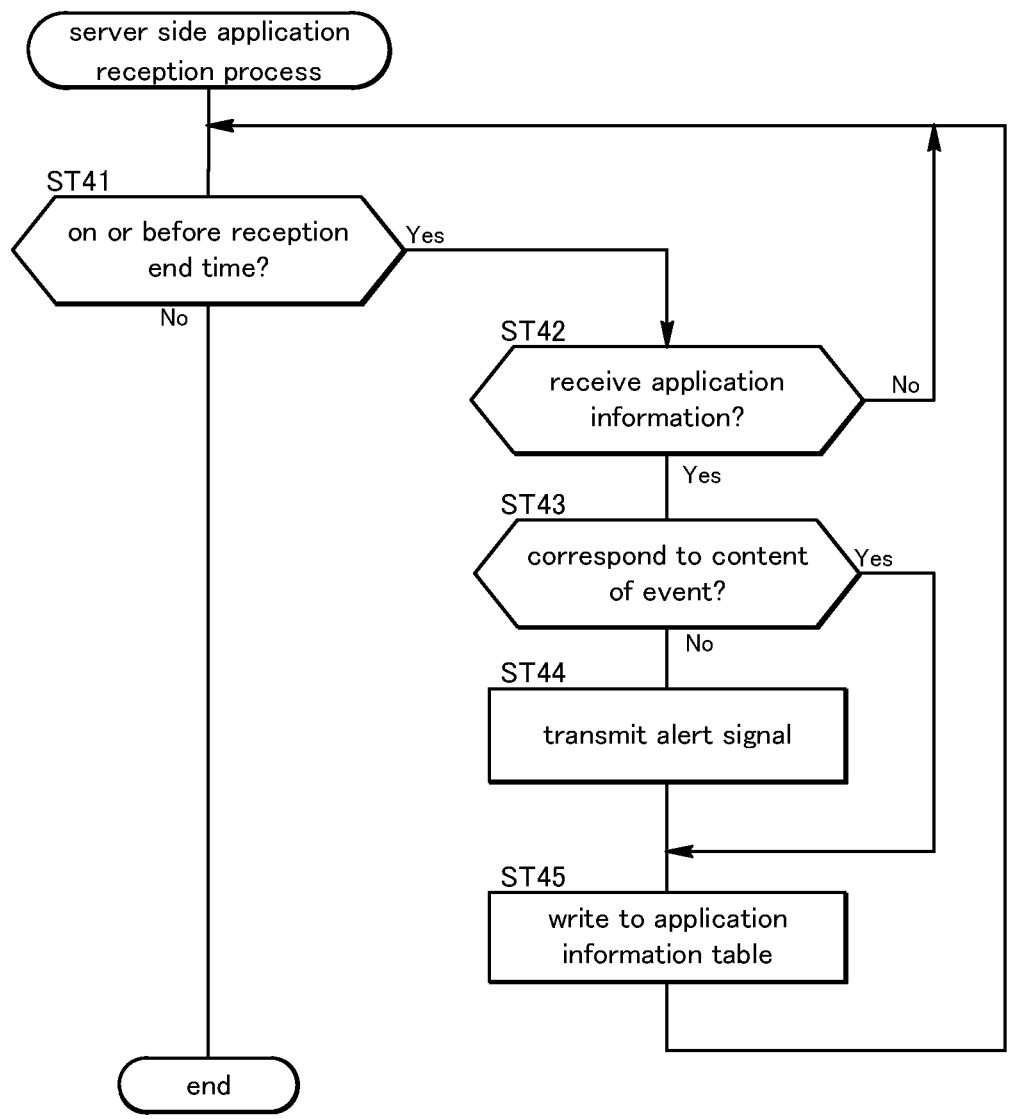
FIG. 10 is a flowchart showing steps of a server side application reception process.

FIG. 10 is a flowchart showing a server side application reception process. The server side application reception process is executed by the application processing unit 22 of the ride-sharing managing server 4. In the first step ST41 of the server side application reception process, the application processing unit 22 determines whether the current time is on or before the reception end time. In a case where the current time is on or before the reception end time, the application processing unit 22 executes step ST42. In a case where the current time is after the reception end time, the application processing unit 22 ends the server side application reception process.

In step ST42, the application processing unit 22 determines whether the application processing unit 22 has received the application information from the user terminal 2. When the application processing unit 22 has received the application information, the application processing unit 22 executes step ST43. When the application processing unit 22 has not received the application information, the application processing unit 22 returns to step ST41 and waits.

In step ST43, the alert unit 30 determines whether the received application information corresponds to the content of the event described on the date corresponding to the implementation period of the action information table T1. When the received application information corresponds to the content of the event, the alert unit 30 executes step ST45. When the received application information does not correspond to the content of the event, the alert unit 30 executes step ST44.

In step ST44, the alert unit 30 transmits an alert signal to the user terminal 2. On receiving the alert signal, the user terminal 2 displays an alert screen. This alert screen may include a warning that the application information does not correspond to the content of the event recorded in the action information table T1, and a display prompting reconfirmation of the application information. When the transmission of the alert signal is completed, the application processing unit 22 executes step ST45.

In step ST45, the application processing unit 22 writes the application information to the application information table T2, and returns to step ST41. At this time, in a case where the user has already made the ride-sharing application after transmitting the application information, the application processing unit 22 may update the application information table T2 by using the received application information.

The effect of the vehicle ride-sharing assist system 1 configured as described above will be described. The recommended ride-sharing condition is set based on the action information including the content of the event of the user in the implementation period, the clock-in time, and the clock-out time. Accordingly, the recommended ride-sharing condition is likely to correspond to the true demand of the user. When the user terminal 2 receives the reception start signal, the user interface 12 displays the recommended ride-sharing condition in step ST22, which is executed first. Accordingly, the user can input the desired ride-sharing condition while checking the recommended ride-sharing condition, so that it is possible to prevent the user from transmitting the ride-sharing condition which does not correspond to the true demand of the user as the desired ride-sharing condition. Accordingly, cancellations of the ride-sharing by the users can be reduced, and thus traffic congestion can be alleviated more reliably. Also, when the recommended ride-sharing condition corresponds to the true demand of the user, the user can make the ride-sharing application by pressing the reservation button, thereby omitting the input of the desired ride-sharing condition.

When the condition of the ride-sharing is changed for the first time after the reception start signal is transmitted to the user terminal 2, the terminal processing unit 11 reads the latest application information from the memory and displays the latest application information which is input to the input fields 40, 41, 42, 43 in advance (ST27, ST28, ST29, S30). When the condition of the ride-sharing is changed for the first time, the recommended ride-sharing condition is saved in the memory as the latest application information. Accordingly, the input fields 40, 41, 42, 43 to which the recommended ride-sharing condition has been input in advance are displayed, so that the user can omit the input of the desired ride-sharing condition.

When the ride-sharing application that does not correspond to the content of the event is made, the alert unit 30 of the ride-sharing managing server 4 transmits the alert signal, and the alert screen is displayed on the user terminal 2. Accordingly, it is possible to prevent the user from making the ride-sharing application that does not correspond to the true demand of the user.

The action information table T1 includes the action information about the user's schedule such as a meeting, a business trip or a vacation. Accordingly, it is possible to appropriately determine whether the ride-sharing is available to the user. Further, the action information table T1 includes the clock-in time and the clock-out time of the user, so that the action history of the user can be grasped more accurately, and thus the recommended ride-sharing condition becomes more suitable for the user. The action information table T1 includes the magnitude, and thus the arrival time can be advanced according to the magnitude in the action information about the implementation period. Accordingly, the recommended ride-sharing condition becomes more suitable for the user.

Second Embodiment

Figure 11:
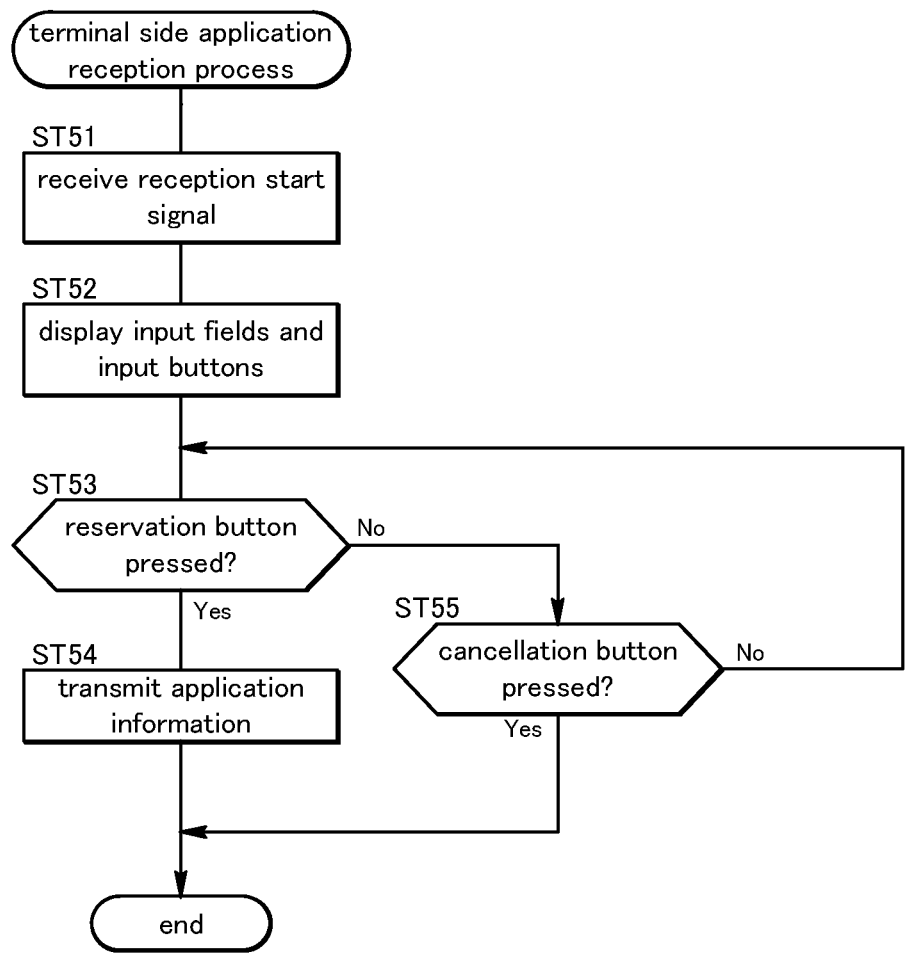
FIG. 11 is a flowchart showing steps of a terminal side application reception process according to a second embodiment.
Figure 12:
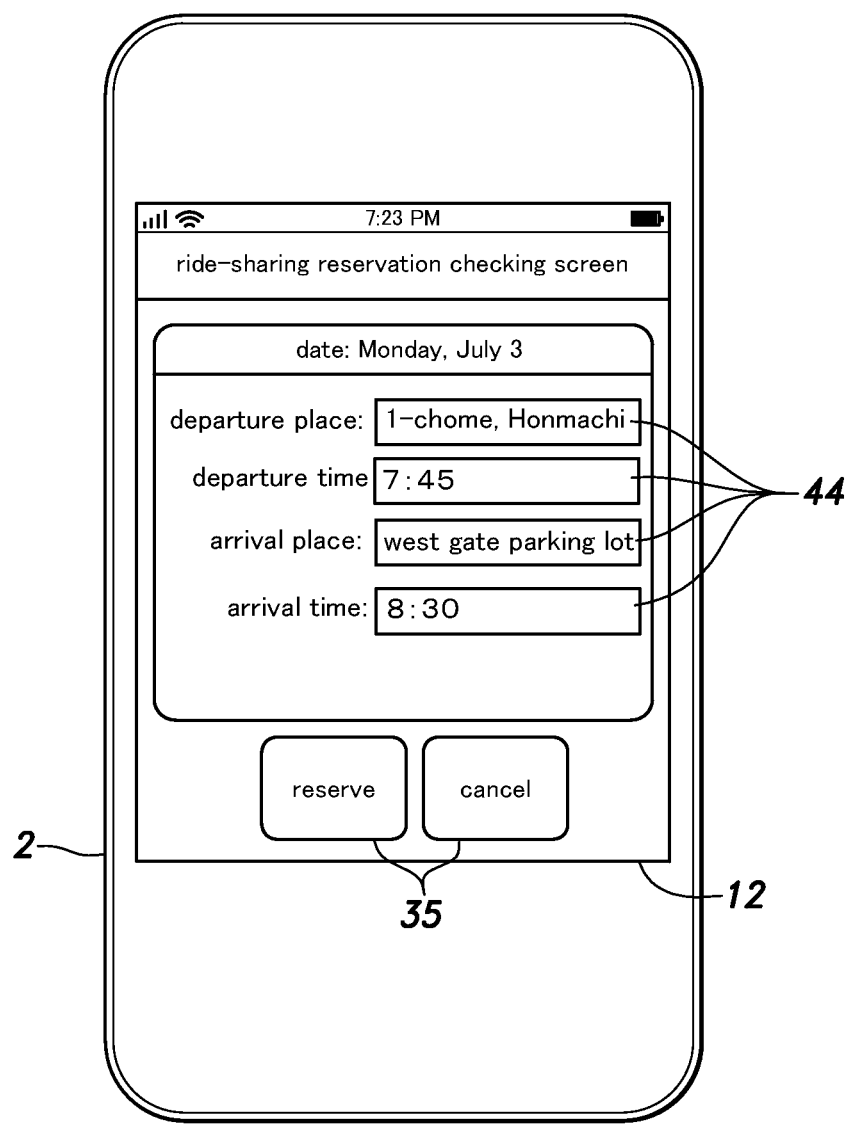
FIG. 12 is an explanatory diagram of a screen display of a user terminal in the terminal side application reception process according to the second embodiment.

As shown in FIG. 11, the vehicle ride-sharing assist system 1 according to the second embodiment is different from the vehicle ride-sharing assist system 1 according to the first embodiment in the terminal side application reception process. In the first step ST51, the terminal processing unit 11 receives the reception start signal. Then, in step ST52, the terminal processing unit 11 causes the user interface 12 to display the input buttons 35 and input fields 44 as shown in FIG. 12. The input buttons 35 include the reservation button and the cancellation button. The desired ride-sharing condition, which includes at least one of the departure place, the departure time, the arrival place, and the arrival time desired by the user, can be input to the input fields 44, and the recommended ride-sharing condition has been input to the input fields 44 in advance. The user can input the desired ride-sharing condition by an input to each input field 44. At this time, the recommended ride-sharing condition has been input to the input fields 44 in advance, so that the desired ride-sharing condition can be easily inputted. When the reservation button is pressed, the terminal processing unit 11 proceeds to step ST54, transmits the input application information to the ride-sharing managing server 4, and ends the terminal side application reception process. In a case where the cancellation button is pressed (step ST55), the terminal processing unit 11 ends the terminal side application reception process. In a case where the cancellation button is not pressed, the terminal processing unit 11 returns to step ST53.

Concrete embodiments of the present invention have been described in the foregoing, but the present invention should not be limited by the foregoing embodiments and various modifications and alterations are possible. After step ST42 and before step ST41 of the server side application reception process, in a case where the availability determination unit 32 determines that the ride-sharing is available to the user and the ride-sharing application has not been completed, the alert unit 30 may transmit a signal for causing the user terminal 2 to display an alarm screen to notify that the ride-sharing application has not been completed. Accordingly, the users who use the ride-sharing can be increased.

In the above embodiment, the vehicle ride-sharing assist system 1 is used to assist the ride-sharing for commuting of the group such as a company or a government office. However, the present invention is not limited to this embodiment. The vehicle ride-sharing assist system 1 may be used by the users who belong to a facility such as a school, a kindergarten, a nursery school, a sports club, a nursing home, and a shopping center, and may provide the ride-sharing service for each time zone to move to and from the facility. In a case where the vehicle ride-sharing assist system 1 is used to assist the ride-sharing for going to school, the arrival place may be set to a predetermined place common to all users, such as the front of the school gate. Further, the content of the event may include information about a school trip or the like. In a case where the vehicle ride-sharing assist system 1 is used to assist a movement of a care recipient to a nursing home when the care recipient uses daycare, the content of the event may include the content of the service which the care recipient receives.

In the above embodiment, the commuting hours in the morning are set to the implementation period of the ride-sharing service by the vehicle ride-sharing assist system 1. However, the leaving hours in the evening may be set to the implementation period. In such a case, the recommended condition setting unit 33 may estimate the clock-out time of each user in the implementation period by averaging the past clock-out times of each user acquired by the attendance recording unit 18. After that, the recommended condition setting unit 33 may set the estimated clock-out time to the departure time of the recommended ride-sharing condition.

The action information held by the action information managing server 7 may be any information as long as the action information enables the position of each user at a future time to be estimated. The action information may be schedule information (action schedule information) of the user that enables the position of each user at the future time to be determined, or may be a position (action history information) of each user at a past time that enables the position of each user to be estimated. Further, the action information may include both the action schedule information and action history information. The action information may be updated at any time based on the position of the user terminal 2.

In the above embodiment, the vehicle ride-sharing assist system 1 is used in order to reduce traffic congestion. However, the present invention is not limited to this embodiment. The ride-sharing managing server 4 may optimize the combination of users to be grouped and the travel route of the vehicle used for the ride-sharing in order to save energy and reduce $CO_2$ emissions. In the above embodiment, the recommended ride-sharing condition and the desired ride-sharing condition include all of the departure place, the departure time, the arrival place, and the arrival time. However, the recommended ride-sharing condition and the desired ride-sharing condition may include at least one of the departure place, the departure time, the arrival place, and the arrival time.

Glossary of Terms

1: vehicle ride-sharing assist system
2: user terminal
3: network
4: ride-sharing managing server
7: action information managing server
11: terminal processing unit
12: user interface
12A: display unit
12B: input unit
18: attendance recording unit
35: input button (decision button)
40-44: input field

The invention claimed is:

1. A vehicle ride-sharing assist system for assisting ride-sharing by a plurality of users, comprising:
a plurality of terminals, each terminal operated by a respective one of the plurality of users via a respective user interface;
an action information managing server comprising a first processor coupled to at least one first memory device, the first processor programmed to store action information of the users in the at least one first memory device;
a ride-sharing managing server comprising a second processor coupled to at least one second memory device, the second processor programmed to:
communicate with the first processor and the terminals via a network;
determine whether ride-sharing is available to each of the users in a specific period, based on the action information;
set a recommended ride-sharing condition for each user to whom the ride-sharing is available based on the action information, wherein the recommended ride-sharing condition includes at least one of a recommended departure place, a recommended departure time, a recommended arrival place, and a recommended arrival time; and
transmit a reception start signal to each terminal operated by a corresponding user to whom the ride-sharing is available, the reception start signal indicating that reception of a ride-sharing application has started, wherein the reception start signal includes the recommended ride-sharing condition of the corresponding user to whom the ride-sharing is available;

wherein, each terminal operated by the corresponding user to whom the ride-sharing is available is programmed to, in response to receiving the reception start signal including the recommended ride-sharing condition:
  display, at the respective user interface, the recommended ride-sharing condition;
  display, at the respective user interface, a decision button together with the recommended ride-sharing condition;
  receive a decision, via the decision button, whether to transmit the recommended ride-sharing condition as a desired ride-sharing condition to the second processor,
  when an input corresponding to a decision not to transmit the recommended ride-sharing condition as the desired ride-sharing condition to the second processor is made via the decision button, sequentially display, at the respective user interface, a plurality of input screens each including an input field into which the desired ride-sharing condition can be input and a change button for updating the desired ride-sharing condition, the desired ride-sharing condition including at least one of a desired departure time and a desired arrival time of the corresponding user to whom the ride-sharing is available; and
  receive, at the respective user interface, an input operation from the corresponding user to whom the ride-sharing is available, wherein the input operation includes the desired ride-sharing condition, and wherein the second processor is further programmed to:
  receive the desired ride-sharing condition transmitted from each terminal operated by each corresponding user to whom the ride-sharing is available; and
  create an operation schedule of the ride-sharing for a prescribed implementation period based on the received desired ride-sharing conditions.

2. The vehicle ride-sharing assist system according to claim 1, wherein each terminal operated by the corresponding user to whom the ride-sharing is available is further programmed to simultaneously display, at the respective user interface, (i) the input field into which the desired ride-sharing condition can be input and (ii) the recommended ride-sharing condition.

3. The vehicle ride-sharing assist system according to claim 2, wherein each terminal operated by the corresponding user to whom the ride-sharing is available is further programmed to cause the recommended ride-sharing condition to be displayed in the input field.

4. The vehicle ride-sharing assist system according to claim 1, wherein each terminal operated by the corresponding user to whom the ride-sharing is available is further programmed to display the recommended ride-sharing condition in the input field.

5. The vehicle ride-sharing assist system according to claim 1, wherein the recommended departure place or the recommended arrival place is set to a prescribed place common to all of the users to whom the ride-sharing is available.

6. The vehicle ride-sharing assist system according to claim 1, wherein the action information includes movement information corresponding to presence or absence of a movement to a place stored in advance, and
  when the action information for the implementation period of the ride-sharing includes the movement information corresponding to the absence of the movement, the second processor does not set the recommended ride-sharing condition.

7. The vehicle ride-sharing assist system according to claim 1,
  wherein the action information includes at least one past clock-in time, and
  the second processor is further programmed to:
    estimate a clock-in time of each of the users for the implementation period based on the at least one past clock-in time; and
    set the recommended arrival time based on the estimated clock-in time.

8. The vehicle ride-sharing assist system according to claim 7, wherein the second processor is further programmed to:
  output a magnitude corresponding to each piece of the action information stored in the at least one first memory device;
  calculate a shift time that increases as the magnitude of an event occurring on a next day increases; and
  set the recommended arrival time based on a time earlier than the estimated clock-in time by the shift time.

9. The vehicle ride-sharing assist system according to claim 1,
  wherein the action information includes at least one past clock-out time, and
  the second processor is further programmed to:
    estimate a clock-out time of each of the users for the implementation period based on the at least one past clock-out time; and
    set the recommended departure time based on the estimated clock-out time.

10. The vehicle ride-sharing assist system according to claim 1,
  wherein the action information includes at least one past clock-in time, and
  the second processor is further programmed to:
    estimate a clock-in time of each of the users for the implementation period based on the past clock-in time;
    set a first time based on the estimated clock-in time;
    output a magnitude corresponding to each piece of the action information stored in the at least one first memory device;
    calculate a shift time that increases as the magnitude of an event occurring on a next day increases;
    set a second time based on a time earlier than the estimated clock-in time by the shift time;
    compare the first time and the second time; and
    output an earlier of the first time and the second time as the recommended arrival time.

* * * * *